(12) United States Patent
L'Heureux et al.

(10) Patent No.: US 11,624,680 B2
(45) Date of Patent: Apr. 11, 2023

(54) OPTICAL FIBER ENDFACE INSPECTION MICROSCOPE HAVING ADAPTER TIP DETECTION AND AUTOCONFIGURATION

(71) Applicant: EXFO Inc., Quebec (CA)

(72) Inventors: Mario L'Heureux, Levis (CA); Guillaume Lavallee, Boischatel (CA); Robert Baribault, Quebec (CA)

(73) Assignee: EXFO Inc., Quebec (CA)

( * ) Notice: Subject to any disclaimer, the term of this patent is extended or adjusted under 35 U.S.C. 154(b) by 67 days.

(21) Appl. No.: 17/446,368

(22) Filed: Aug. 30, 2021

(65) Prior Publication Data

US 2022/0074810 A1    Mar. 10, 2022

Related U.S. Application Data

(60) Provisional application No. 63/118,245, filed on Nov. 25, 2020, provisional application No. 63/076,633, filed on Sep. 10, 2020.

(51) Int. Cl.
*G01M 11/00* (2006.01)
*G01M 11/02* (2006.01)
(Continued)

(52) U.S. Cl.
CPC ........ *G01M 11/31* (2013.01); *G01M 11/0257* (2013.01); *G01N 21/8803* (2013.01);
(Continued)

(58) Field of Classification Search
CPC .. G02B 6/3807; G02B 6/3825; G02B 6/3826; G02B 6/3831; G02B 6/385;
(Continued)

(56) References Cited

U.S. PATENT DOCUMENTS 5,960,137 A * 9/1999 Noll ..................... G02B 6/3885
385/139
6,898,368 B2 * 5/2005 Colombo ............. G02B 6/3895
385/147

(Continued)

FOREIGN PATENT DOCUMENTS

| CN | 102708352 | 2/2015 |
| CN | 204496049 | 7/2015 |
| WO | 2017144575 A1 | 8/2017 |

*Primary Examiner* — Gordon J Stock, Jr.
(74) *Attorney, Agent, or Firm* — Helene Chotard

(57) ABSTRACT

There are provided an optical-fiber connector endface inspection microscope system and a method for inspecting an endface of an optical-fiber connector. The inspection microscope device is releasably connectable to an adapter tip configured to interface with the optical-fiber connector to inspect the endface thereof. The adapter tip is one among a plurality of adapter tip types adapted to inspect respective types of optical-fiber connectors. The optical-fiber connector endface inspection microscope system comprises a tip detection system adapted to recognize the type of the adapter tip among the plurality of adapter tip types; and is configured to analyze inspection images to produce an inspection result for the endface, at least partly based on a fiber type corresponding to the recognized adapter tip and/or other information read by the tip detection system.

22 Claims, 6 Drawing Sheets

(51) Int. Cl.
*G02B 6/38* (2006.01)
*G06T 7/00* (2017.01)
*G01N 21/88* (2006.01)
*G01N 21/95* (2006.01)

(52) U.S. Cl.
CPC ............ *G01N 21/95* (2013.01); *G02B 6/385* (2013.01); *G06T 7/0004* (2013.01); *G06T 2207/10056* (2013.01); *G06T 2207/30164* (2013.01)

(58) Field of Classification Search
CPC ......... G01M 11/0207; G01M 11/0214; G01M 11/0257; G01M 11/0278; G01M 11/30; G01M 11/31; G01N 21/88; G01N 21/8803; G01N 21/8806; G01N 21/94; G01N 21/95; G01N 21/9515; G01N 2021/9511; G06T 7/0004; G06T 2207/10056; G06T 2207/30164
See application file for complete search history.

(56) References Cited

U.S. PATENT DOCUMENTS

| | | | | |
|---|---|---|---|---|
| 7,165,728 | B2* | 1/2007 | Durrant | G02B 6/3807 356/73.1 |
| 7,210,858 | B2* | 5/2007 | Sago | G02B 6/3895 385/88 |
| 9,064,022 | B2* | 6/2015 | Smith | H04Q 1/136 |
| 9,417,444 | B2* | 8/2016 | Huang | G02B 21/365 |
| 9,453,971 | B2* | 9/2016 | Anderson | G02B 6/3825 |
| 9,797,806 | B1* | 10/2017 | Zhou | G02B 6/3885 |
| 10,175,142 | B2* | 1/2019 | Lafrance | G01M 11/30 |
| 11,150,417 | B2* | 10/2021 | Tosik | G01M 11/088 |
| 11,323,176 | B2* | 5/2022 | Vaez-Ghaemi | G01M 11/3109 |
| 2004/0054761 | A1 | 3/2004 | Colombo et al. | |
| 2005/0206889 | A1 | 9/2005 | Koudelka et al. | |
| 2013/0230627 | A1 | 9/2013 | Hansen et al. | |
| 2015/0348435 | A1* | 12/2015 | Hogan | G09B 1/40 434/224 |
| 2021/0232154 | A1* | 7/2021 | Kewitsch | G02B 6/255 |

\* cited by examiner

| Type of adapter tip | Fiber layout type | Fiber type | Fiber Layout |
|---|---|---|---|
| MPO-A | Multi-fiber | Singlemode APC | Any |
| OTIP-A | Multi-fiber | Singlemode APC | 1x12 |
| MPO-U | Multi-fiber | Multimode UPC | Any |
| 2S-LC-A | Single-fiber | Singlemode APC | Single |
| 2S-LC-U | Single-fiber | Singlemode UPC or Multimode UPC | Single |
| SC-A | Single-fiber | Singlemode APC | Single |
| OTAP-A | Single-fiber | Singlemode APC | Single |
| U2.5-A | Single-fiber | Singlemode APC | Single |
| U2.5-U | Single-fiber | Singlemode UPC or Multimode UPC | Single |
| U1.25-A | Single-fiber | Singlemode APC | Single |
| U1.25-U | Single-fiber | Singlemode UPC or Multimode UPC | Single |
| LC-A | Single-fiber | Singlemode APC | Single |
| LC-U | Single-fiber | Singlemode UPC or Multimode UPC | Single |
| SC-FC-U | Single-fiber | Singlemode UPC or Multimode UPC | Single |
| SFADP-A60 | Single-fiber | Any | Single |
| SFADP-400 | Single-fiber | Any | Single |
| DX-LC-A | Duplex-fiber | Singlemode APC | 1x2 |
| DX-LC-U | Duplex-fiber | Singlemode UPC or Multimode UPC | 1x2 |

Fig. 2

OPTICAL FIBER ENDFACE INSPECTION MICROSCOPE HAVING ADAPTER TIP DETECTION AND AUTOCONFIGURATION

TECHNICAL FIELD

The present description generally relates to inspection of optical-fiber connector endfaces, and more particularly to optical-fiber connector endface inspection microscopes adapted to inspect various types of optical-fiber connectors using corresponding interchangeable adapter tips.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscopes are commonly employed to visually inspect and/or to analyze the optical-fiber endface of an optical-fiber connector at installation or during maintenance of optical communication networks, in order to verify the quality of the optical-fiber connection.

Because of the wide variety of optical-fiber connector types deployed in the telecommunication industry, optical-fiber connector endface inspection microscopes are typically employed with interchangeable adapter tips so as to allow inspection of various types of optical-fiber connectors directly or as inserted in an optical-fiber connector adapter. Optical-fiber connector endface inspection microscopes are therefore typically designed for use with an adapter tip selected among a plurality of adapter tip types.

International Standard IEC-61300-3-35 defines connector endface acceptance criteria (i.e., pass/fail threshold(s)) for fiber endface inspection. For example, it defines the size and number of defects that are acceptable over the core, cladding, adhesive or contact regions of the endface. Endface analysis parameters and acceptance criteria vary as a function of the type of connector and the type of fiber being inspected (i.e., singlemode vs multimode and APC vs UPC). Some users of optical-fiber connector endface inspection microscopes may simply not be aware that these acceptance criteria need to be selected or may forget to change the threshold(s) when inspecting different types of optical-fiber connectors. Furthermore, users do not always know which acceptance criteria to select.

Mistaken acceptance criteria can be problematic because it can result in false acceptance or false rejection of some connectors which can remain unnoticed or cause the user to perform unnecessary cleaning and other tasks, or even worst, cause the user to have to come back later to repair bad connections that could have been avoided in the first place by proper acceptance criteria. Such extra steps can be very costly and cause substantial delays.

In some cases, the image acquisition parameters (e.g. field of view) and/or image analysis parameters (image processing) are themselves tip or connector dependent and need to be manually selected by the user, adding an extra step that is detrimental to the efficiency of the measurement process. And again, the user may not always know which parameters to select and this selection is likely to be prone to user error.

There therefore remains a need for optical-fiber connector endface inspection microscopes and inspection methods that would assist users in selecting the right acceptance criteria, endface analysis parameters image and/or acquisition parameters, as a function of the optical-fiber connector under inspection.

SUMMARY

Because each tip is designed to inspect a specific type or limited type(s) of optical-fiber connectors, a correspondence can typically be made between the adapter tip type and the connector endface acceptance criteria, image acquisition parameters and/or image analysis parameters to be selected. There is therefore proposed to assist the users in selecting the right acceptance criteria, image acquisition parameters and/or image analysis parameters by selecting the configuration that corresponds to the type of adapter tip being actually connected, or to a limited number of choices that are possible for the connected adapter tip.

For that purpose, there is proposed to include a tip detection system on the optical-fiber connector endface inspection microscopes to detect the type of adapter tip being connected to the inspection microscope. Once the tip is detected, the microscope can automatically select the corresponding connector endface acceptance criteria (e.g., pass/fail thresholds), image acquisition parameters (e.g. field of view) and/or endface analysis parameters (e.g. endface zones). In some embodiments, some features (e.g. power detection) may also be disabled if not supported with the detected tip.

In accordance with one aspect, connector endface acceptance criteria (e.g., pass/fail thresholds) are automatically configured by the inspection microscope based on the detected tip. For example, if an MPO UPC tip is detected, the inspection microscope may select the multimode pass/fail threshold(s) because singlemode configuration is not available for MPO UPC connectors. Singlemode is possible only for MPO APC connectors and a series of tips is dedicated to these connectors. From these assumptions, the inspection microscope software application can be automatically configured with the correct pass/fail thresholds to achieve a successful test.

Therefore, in accordance with one aspect, there are provided an optical-fiber connector endface inspection microscope system and a method for inspecting an endface of an optical-fiber connector. The inspection microscope device is releasably connectable to an adapter tip configured to interface with the optical-fiber connector to inspect the endface thereof. The adapter tip is one among a plurality of adapter tip types adapted to inspect respective types of optical-fiber connectors. The optical-fiber connector endface inspection microscope system comprises a tip detection system adapted to recognize the type of the adapter tip among the plurality of adapter tip types; and is configured to analyze inspection images to produce an inspection result for the endface, at least partly based on a fiber type corresponding to the recognized adapter tip and/or other information read by the tip detection system.

In accordance with one aspect, there is provided an optical-fiber connector endface inspection microscope system for inspecting an endface of an optical-fiber connector, the optical-fiber connector endface inspection microscope system comprising:
an optical-fiber connector endface inspection microscope comprising an image detector for capturing at least one image of the endface to be inspected;
a housing structure enclosing the optical-fiber connector endface inspection microscope and releasably connectable to an adapter tip configured to interface with the optical-fiber connector to inspect the endface thereof, the adapter tip being of one type among a plurality of adapter tip types adapted to inspect respective types of optical-fiber connectors;

a tip detection system adapted to recognize said one type of the adapter tip among the plurality of adapter tip types;

a processing unit configured to:

determine at least one of a connector endface acceptance criterion among a set of connector endface acceptance criteria, at least partly based upon a fiber type corresponding to the recognized type of adapter tip; and analyze the at least one image to produce an inspection result for the endface based on the determined connector endface acceptance criterion.

In accordance with another aspect, there is provided a method for inspecting the endface of an optical-fiber connector using optical-fiber connector endface inspection microscope device releasably connectable to an adapter tip configured to interface with the optical-fiber connector to inspect the endface thereof, the adapter tip being one among a plurality of adapter tip types adapted to inspect respective types of optical-fiber connectors, the method comprising:

using a tip detection system, recognizing said one type of the adapter tip among the plurality of adapter tip types;

using an optical-fiber connector endface inspection microscope, capturing at least one image of the endface to be inspected;

determining at least one connector endface acceptance criterion among a set of connector endface acceptance criteria, at least partly based upon a fiber type corresponding to the recognized type of adapter tip; and analyzing the at least one image to produce an inspection result for the endface based on the determined connector endface acceptance criterion.

In accordance with yet another aspect, there is provided an optical-fiber connector endface inspection microscope system for inspecting an endface of an optical-fiber connector, the optical-fiber connector endface inspection microscope device comprising:

an optical-fiber connector endface inspection microscope comprising an image detector for capturing at least one image of the endface to be inspected;

a housing structure enclosing the optical-fiber connector endface inspection microscope and releasably connectable to an adapter tip configured to interface with the optical-fiber connector to inspect the endface thereof, the adapter tip being of one type among a plurality of adapter tip types adapted to inspect respective types of optical-fiber connectors;

a tag reader (such as a RFID tag reader, a barcode reader or a QR code reader) adapted to read information contained in a tag associated with the adapter tip;

a processing unit configured to:

analyze the at least one image to produce an inspection result for the endface, at least partly based upon the information read from the tag.

In some embodiments, the processing unit is further configured to determine at least one connector endface acceptance criterion among a set of connector endface acceptance criteria, at least partly based upon the information read from the tag; and analyze the at least one image to produce an inspection result for the endface based on the determined connector endface acceptance criterion.

In accordance with a further aspect, image acquisition parameters (e.g. field of view) for the next image capture may further be automatically configured by the inspection microscope. For example, if the detected tip is a single-fiber or a duplex tip, the field of view of the image acquisition may be configured in a narrow-angle mode, whereas, if the detected tip is a multifiber tip, the image acquisition may be configured in a broad-angle mode.

In accordance with a further aspect, image analysis parameters may further be automatically configured by the inspection microscope. Depending on the detected tip, the image analysis software may be configured to look for a single ferrule (single-fiber tip), two ferrules (duplex tip) or up to 4 rows of 16 fibers on the same ferrule (multifiber tip), without having to rely on an image analysis from the acquired image to detect the type of connector being inspected.

In some embodiments, tips are detected using a RFID tag positioned on each tip. An RFID reader is included in the inspection microscope. An antenna is installed inside the inspection microscope and a special logo placed on the inspection microscope body shows where this antenna is located. The tip is detected and recognized by the user tapping it (or otherwise bringing it close) to the marked antenna location.

In accordance with yet another aspect, there is provided an optical-fiber connector endface inspection microscope system for inspecting an endface of an optical-fiber connector, the optical-fiber connector endface inspection microscope device comprising:

an optical-fiber connector endface inspection microscope comprising an image detector for capturing at least one image of the endface to be inspected;

a housing structure enclosing the optical-fiber connector endface inspection microscope and releasably connectable to an adapter tip configured to interface with the optical-fiber connector to inspect the endface thereof, the adapter tip being one among a plurality of adapter tip types adapted to inspect respective types of optical-fiber connectors;

a tag reader (such as a RFID tag reader, a barcode reader or a QR code reader) adapted to read information contained in a tag associated with the adapter tip;

a processing unit configured to:

determine of at least one connector type that can be inspected using the adapter tip, based on the recognized type of adapter tip; and display on a display screen, a visual indicator corresponding to the at least one connector type that can be inspected using the adapter tip.

For ease of reading, in the following description, the "optical-fiber connector endface inspection microscope" and the "optical-fiber connector endface inspection microscope system" may be referred to respectively as an "inspection microscope" and an "inspection microscope system". Similarly, the "optical-fiber connector endface" may be referred to as a "connector endface" or simply "endface".

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the illumination source can emit light in the blue region (about 470 nm), in the violet region (about 405 nm) or any other suitable spectral region within the visible spectrum, the near ultraviolet spectrum or the near infrared spectrum. Those skilled in the art will understand, however, that these wavelength ranges are provided for illustrative purposes only and that the present techniques may operate beyond these ranges.

Further features and advantages of the present invention will become apparent to those of ordinary skill in the art upon reading of the following description, taken in conjunction with the appended drawings.

BRIEF DESCRIPTION OF THE DRAWINGS

FIG. 2 is a table illustrating the mapping between adaptor tip types and fiber types, as well as other parameters, in accordance with one embodiment.

Figure 1:
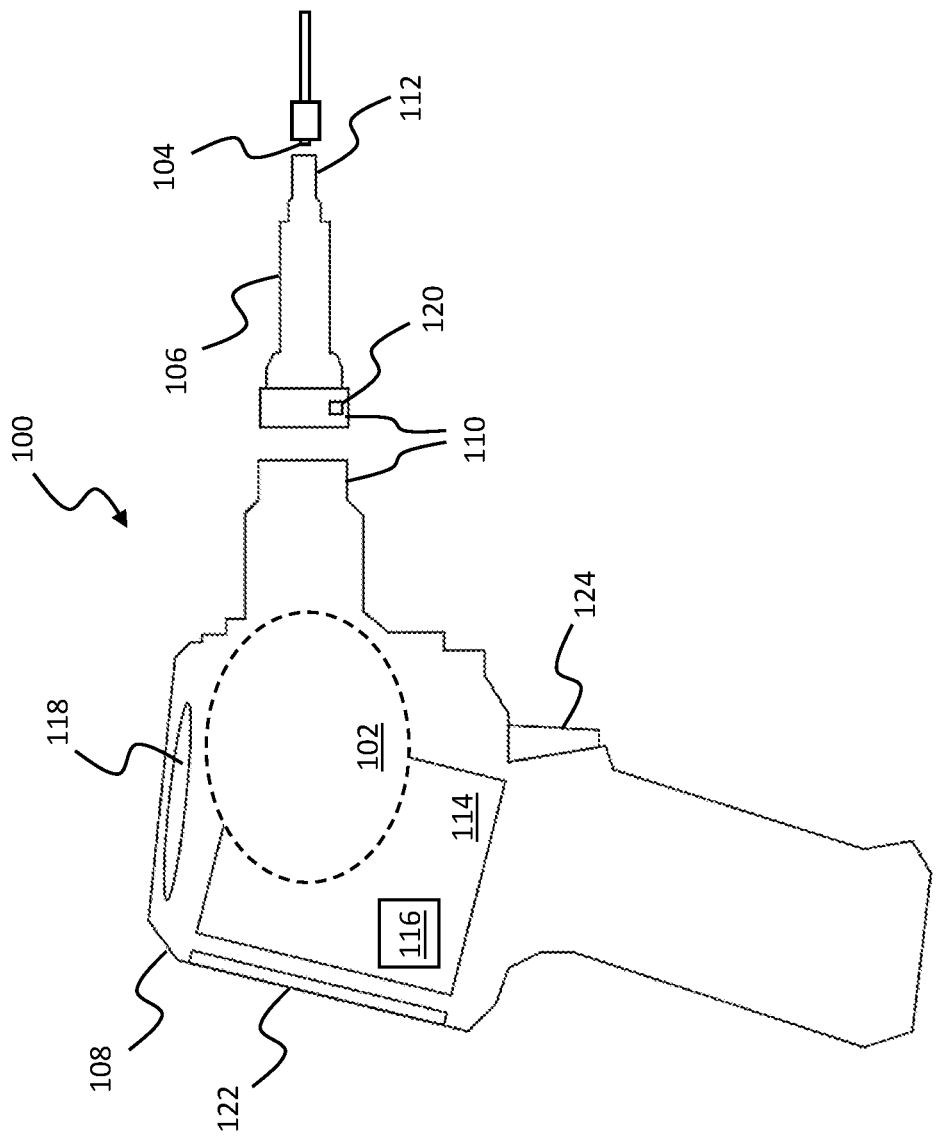
FIG. 1 is a schematic illustrating an optical-fiber connector endface inspection microscope system in accordance with one embodiment comprising a tip detection system embodied in a RFID reader.

It will be noted that throughout the drawings, like features are identified by like reference numerals. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Now referring to the drawings, FIG. 1 shows an optical-fiber connector endface inspection microscope system for inspecting an endface of an optical-fiber connector 104, in accordance with one embodiment comprising a tip detection system embodied by a RFID reader comprising a RFID controller 116 and RFID antenna 118.

The inspection microscope system comprises the inspection microscope device 100 having the required optical hardware of an optical-fiber connector endface inspection microscope 102 (further described hereinbelow), enclosed in a housing structure 108, for capturing images of the connector endface. The inspection microscope system further comprises an interchangeable adapter tip 106 connectable to an inspection end of the inspection microscope 102. The adapter tip 106 is releasably connectable to the inspection microscope device 100 via a connection mechanism 110, and is interchangeable with other adapter tips in order to adapt the connector-mating interface 112 of the inspection microscope system to different configurations of optical-fiber connectors such as, e.g., LC/PC, LC/APC, SC/PC, SC/APC or FC/APC connectors or bulkhead adapters, as known in the art. The connector-mating interface 112 mechanically engages with the connector 104 or a bulkhead adapter in which lies the connector 104 and its optical-fiber connector endface to be inspected.

The adapter tip is therefore one among a plurality of adapter tip types adapted to inspect respective types of optical-fiber connectors, either bare connectors or connectors lying in bulkhead adaptors.

The connector 104 typically has a ferrule end (not shown), which coincides with the connector endface, and which is perpendicular (UPC) or at an 8-degree angle (APC) to a propagation axis of one or more optical fibers (not shown). As will be understood, the present description applies equivalently to single-fiber and multi-fiber connectors, to UPC and APC connectors, and to single-mode or multimode fiber connectors. The inspection microscope system 200 can be adapted to receive such different configurations of optical-fiber connectors by connecting the corresponding adapter tip 106.

In FIG. 1, the inspection microscope device 100, the adapter tip 106 and the optical-fiber connector 104 are shown disconnected from one another but it will be understood that during inspection, the adapter tip 106 is secured to the housing structure 108 of the inspection microscope device 100 via the connection mechanism 110, and the optical-fiber connector 104 is mechanically engaged to the adapter tip 106 via the connector-mating interface 112.

The inspection microscope device 100 further comprises a processing unit 114 configured to analyze images captured by the inspection microscope 102, to produce an inspection result for the endface under inspection. The inspection result typically comprises a pass/fail determination based on at least one connector endface acceptance criterion, e.g. pass/fail thresholds. Image analysis may comprise the finding of defects (caused by dirt or scratches) on the connector endface based on image processing, and evaluating the size and number of such defects within some regions of the connector endface, i.e. the core, cladding, adhesive or contact regions. Once the defects are found and characterized, a pass/fail status may be reached from the applicable acceptance criteria. For example, the acceptance criteria may define the size and number of defects that are acceptable over the core, cladding, adhesive or contact regions of the endface.

In one embodiment, a set of connector endface acceptance criteria (fiber type dependent) is defined, e.g., by an international standard such as International Standard IEC-61300-3-35. Among the set of connector endface acceptance criteria, the applicable acceptance criterion is dependent upon the fiber type of the connector under inspection. In conventional optical-fiber connector endface inspection microscope devices, the fiber type of the connector under inspection is selected by the user and the corresponding acceptance criteria are applied.

In other embodiments, sets of acceptance criteria may otherwise be defined, e.g., by other industry standards, custom standards defined by the client requesting connector inspection or be set by a user. In other words, a set of acceptance criterion may be hardcoded in memory of the processing unit 114 or be made programmable, user-customizable or user-selectable among sets of acceptance criterion saved in memory.

Furthermore, depending on the detected tip, the image analysis software may be configured to look for a single ferrule (single-fiber tip), two ferrules (duplex tip) or up to 4 rows of 16 fibers on the same ferrule (multifiber tip), without having to rely on an image analysis from the acquired image to detect the type of connector being inspected.

To do so, the processing unit 114 may configure the optical-fiber connector endface inspection microscope 102 based on image acquisition parameters, which can be dependent on the type of connector under inspection, i.e. single-fiber, multi-fiber or duplex-fiber. For example, the field of view of the inspection microscope 102 may be made configurable as a function of the type of connector under inspection, and more particularly, on whether the connector under inspection is single-fiber, multi-fiber or duplex-fiber.

For example, if the detected tip is a single-fiber or a duplex tip, the field of view of the image acquisition may be configured in a narrow-angle mode, whereas, if the detected tip is a multifiber tip, the image acquisition may be configured in a broad-angle mode. For example, in some embodiments, the image acquisition module comprises two image detectors (e.g., two CMOS). Combining images acquired on the two image detectors allows to capture a larger field of view (broad-angle mode) compared to a single image detector (narrow-angle mode). The dual image detector configuration is useful for inspecting multifiber connectors. For single-fiber and duplex connectors, a single image detector can be used. In this case, if the detected tip is a single-fiber tip or a duplex tip, the image acquisition may be configured to use a single image detector, whereas, if the detected tip is a multifiber tip, the image acquisition will be configured to capture images using the dual image detectors.

In order to assist users in selecting the right acceptance criteria (e.g., pass/fail thresholds), endface analysis parameters (optical fiber regions on which to apply the criteria) and/or image acquisition parameters (e.g. field of view), the inspection microscope device 100 further comprises a tip detection system. In the embodiment of FIG. 1, the tip detection system is embodied by a RFID reader that is enclosed in the housing structure 108. For example, the RFID reader may be embodied by a RFID controller chip 116 positioned on the electronic board of the processing unit and a RFID antenna 118. The adapter tips 106 designed for use with the inspection microscope device 100 each include a RFID tag 120. The RFID antenna 118 is positioned next to an outer surface of the housing structure 108 so as to allow to read RFID tags 120 that are brought close to the housing structure 108 at the antenna location. The position of the antenna may be marked with a logo on the housing so as to assist the user in finding the optimal position where to bring the RFID tag 120 for detection.

The content of the RFID tag 120 as read by the RFID reader is made available to the processing unit 114 and indicates the type of the adapter tip 106, the fiber type (singlemode vs multimode and UPC vs APC), the fiber layout type (single-fiber, multi-fiber or duplex-fiber) and/or any other relevant information.

Then, the processing unit 114 can select the corresponding connector endface acceptance criteria (e.g., pass/fail thresholds), image acquisition parameters (e.g. field of view) and/or endface analysis parameters (endface zones) at least partly based upon the recognized type of adapter tip, the fiber type associated with the adapter tip or the fiber layout type associated with the adapter tip, to configure the optical-fiber connector endface inspection microscope 102 and analyze images in accordance therewith.

The inspection microscope device 100 of FIG. 1 further comprises a user interface herein embodied by a display screen and more specifically a touch screen. In other embodiments, the inspection microscope device 100 may not comprise a display screen and use, as a user interface, a separate terminal such as a mobile device wirelessly connected to the inspection microscope device 100 (via Bluetooth for example).

The inspection microscope device 100 of FIG. 1 further comprises a trigger button 124 which can be used for by the user to trigger an image capture or trigger the activation of the RFID controller 116 and antenna 118 when the adapter tip 106 to brought close to the RFID antenna 118. For example, in one embodiment, a short press of the trigger button 124 triggers an image capture whereas a long press triggers an RFID reading.

Adapter Type Mapping:

FIG. 2 is a table illustrating the mapping between various possible types of adaptor tips and corresponding fiber types and fiber layout type, as well as other parameters, in accordance with one embodiment.

As shown, from the table of FIG. 2, the type of the adapter tip can be directly mapped to the fiber layout type. As to the fiber type, in many cases, the type of the adapter tip can be mapped to the fiber type of the connector under inspection (see, e.g., STIP-MPO-A or STIP-SC-A). In other cases, it can be mapped to a limited list of possible fiber types (see, e.g., STIP-2S-LC-U). In this later case, the processing unit may not be able to determine the acceptance criteria directly from the recognized adapter tip but may at least be able to determine a limited number of choices of connector endface acceptance criterion (fiber type singlemode UPC or multimode UPC) based on the recognized adapter tip. In such cases, the limited number of choices may be presented to the user on the user interface for user-selection. Other choices that are not possible with the given type of adapter tip may simply be blocked or grayed out on screen.

If the exact fiber type cannot be directly mapped to the recognized adapter tip, presenting a limited number of choices the user may help reduce the risk of human errors. For example, if a tip is recognized as an APC type tip, only APC-type standards will appear in the user selection, making the choice much simpler.

In accordance with International Standard IEC-61300-3-35, optical fiber regions are defined for applying the acceptance criteria, i.e. the core, the cladding, the adhesive and the contact regions. These regions are referred to herein as the endface analysis parameters and vary at least as a function of the fiber type, i.e. singlemode or multimode. Images captured by the inspection microscope 102 are analyzed by the processing unit 114 based on the endface analysis parameters (region definitions), to determine the number and sizes of defects within the optical fiber regions as defined.

The optical fiber regions may be defined in relative to the center point of an optical fiber lying on the optical-fiber connector endface. For example, for single-mode fibers, the core regions may be defined as the region within 25 μm of the center point, the cladding region as the region between 25 and 115 μm of the center point, the adhesive regions as the region between 115 and 135 μm of the center point, and the contact regions as the region between 135 and 250 μm of the center point.

The size and number of defects that are acceptable over each of these regions and then defined. These numbers are referred to herein as the acceptance criteria and varies as a function of the fiber type of connector being inspected (i.e. singlemode APC, singlemode UPC or multimode UPC). In some of the regions, e.g. the core region, no defect may be accepted, whereas in other regions, e.g. the adhesive region or the contact region, there may be no limit. The reader is referred to the IEC-61300-3-35 Standard for a definition of the acceptance criteria for each fiber type and target insertion loss.

Key information for mapping the recognized fiber tip with the corresponding acceptance criteria is registered in the RFID tag or other tag. Referring to FIG. 2, in some embodiments, the adapter type may be recorded in the tag as represented by a text string naming the type of adapter tip or an identification code which can be mapped the adapter tip type via a prerecorded reference table. Once the type of adapter tip is read or otherwise determined, a prerecorded lookup table may be used to map the type of adapter tip with the fiber layout type, the fiber type, the endface analysis parameters and/or the acceptance criteria.

In some other embodiments, the fiber type and/or the fiber layout type may be directly recorded in the tag. Tag reader may then read the fiber type and map it to the acceptance criteria based on a set of acceptance criteria in memory, in association with the possible fiber types. The later example has the advantage of allowing to support adapter tips that could be unknown at the time of releasing the inspection microscope device, which would then not be listed in the prerecorded reference table. All the system would need to determine the proper acceptance criteria would be a reading of the fiber type as registered in the tag.

In further embodiments, even the endface analysis parameters and acceptance criteria themselves may be directly recorded in the tag.

Optionally, information recorded is the tag may further include a text string or an identification number of the connector type or connector types which can be inspected using the adapter tip 106, the fiber layout type (i.e., single-fiber, multi-fiber or duplex fiber), the exact expected fiber layout (if known) in the case of multi-fiber connectors (e.g., 1×12, 1×16, 2×12, 1×2, etc.) and/or the required field of view for inspection using the adapter tip (e.g., narrow-angle mode or broad-angle mode).

Tip Detection System:

Tip detection may rely on an optical, electrical or mechanical interaction between the adapter tip 106 and the inspection microscope device 100. This interaction may occur when the adapter tip 106 is connected to the inspection microscope device 100 or using a separate identification system, such as a RFID reader.

In one embodiment, adapter tips 106 are detected using a RFID tag 120 positioned on each adapter tip 106. An RFID reader 116 is included in the inspection microscope device 100 and comprises a RFID antenna 118 installed inside the inspection microscope device 100, close to an outer surface thereof. The adapter tip 106 is detected and recognized by the user tapping it or bringing it near the RFID antenna 118.

In another embodiment, tip detection may be based on an electromechanical interaction between the adapter tip 106 and the inspection microscope device 100, with the use of push-buttons (i.e. hard keys). For example, regularly-spaced keys (electrical or mechanical) may be provided on the inspection microscope device side of the connection mechanism 110, like a miniature keyboard. These keys may be in the OFF position by default. The adapter tip 106 may be shaped to mechanically depress a specific and unique combination of keys upon connection to the inspection microscope device 100. The tip detection system may then detect which keys are depressed and thereby recognize the type of adapter tip being connected by associating the key sequence to type of adapter tip using a prerecorded reference table.

In one exemplary embodiment, the inspection microscope device 100 may have 4 keys. In this scenario, 16 different types of adapter tips may be recognized using different combinations of pressed keys. Alternatively, the key combination may be directly mapped to the fiber type corresponding to the adapter tip.

The tip detection system may further be provided via a separate device such as a smartphone or other mobile device to be employed and in communication (e.g. a wireless communication via Bluetooth™) with the inspection microscope device 100. For example, in some embodiments, a picture of the adapter tip 106 may be captured using a smartphone camera and an image recognition algorithm be used to detect the type of adapter tip. Various characteristics of the adapter tip may be used for encoding, including its shape or a color present on the outer surface of the adapter tip. For a more robust detection, a visual tag may be affixed, engraved or printed (e.g. using serigraphy) to an outer surface of the adapter tip, such as a linear, a 2D barcode (e.g. a QR code) or any type of custom visual tag, for detection via a photo camera. As for the RFID tag, such a visual tag may record a text string identifying the type of adapter tip or directly record the fiber type and/or fiber layout type.

In some other embodiments, a photo camera may optionally be integrated to the inspection microscope device 100 to capture a picture of the adapter tip 106 and detect the type of adapter tip from a visual recognition or reading of a visual tag.

Figure 3:
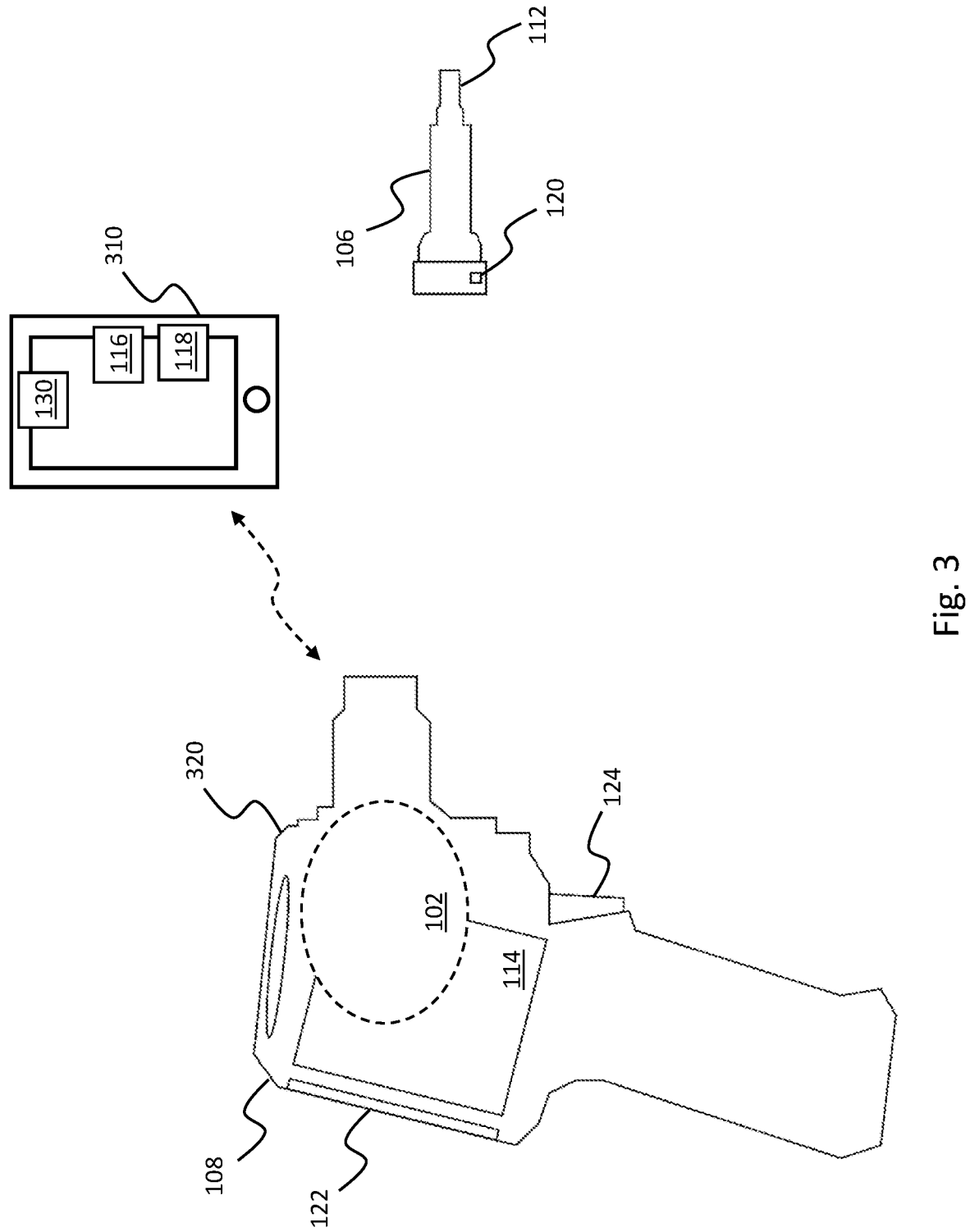
FIG. 3 is a schematic illustrating an optical-fiber connector endface inspection microscope system in accordance with another embodiment comprising a tip detection system as part of a separate mobile device.

FIG. 3 illustrates yet another embodiment of an optical-fiber connector endface inspection microscope system for inspecting an endface of an optical-fiber connector. In this embodiment, the tip detection system is embodied by a RFID reader comprising a RFID controller 116 and RFID antenna 118, included in a mobile device 310 such as smartphone, which is separate from and in communication with (e.g. via a wireless communication such as Bluetooth™) the inspection microscope device 320. The adapter tip 106 is detected and recognized by the user tapping it or bringing it near the RFID antenna 118 of the separate device 310, and the recognized type of adapter tip is communicated to the inspection microscope device 310.

RFID Tag Embodiment

FIGS. 1 and 3 illustrate embodiments where a RFID reader is used as the tip detection system. In these embodiments, an RFID tag 120 is positioned on each adapter tip 106.

The RFID tags 120 are a smaller version of the tags present on most of the latest credit cards. A more than necessary storage is present on each tag and can be programmed by special devices or any modern smartphone. It is possible to lock the information.

The inspection microscope systems of FIGS. 1 and 3 comprise an RFID controller 116 and an RFID antenna 118, which, in FIG. 1, are installed inside the inspection microscope device 100, with a special logo on the outer surface of the housing structure 108 show to the user where this antenna is located. In some embodiments, the inspection microscope device 100 is equipped with a trigger button 124 typically used to initiate a new image capture.

Figure 4:
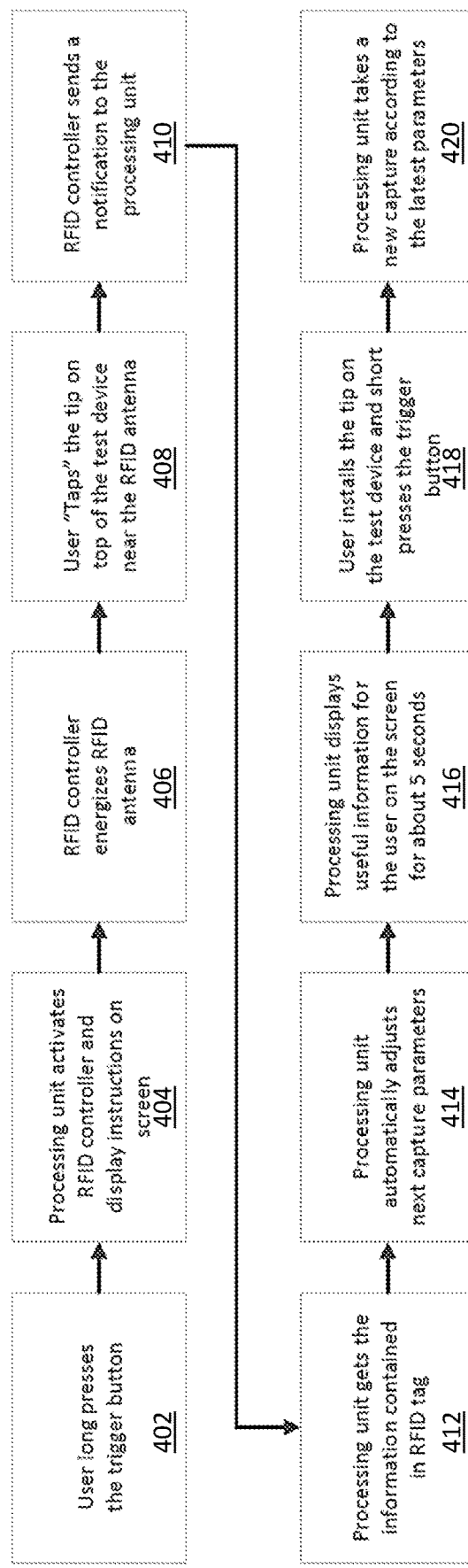
FIG. 4 is a flowchart illustrating an example procedure for inspecting the endface of an optical-fiber connector, using an inspection microscope device to detect the type of adapter tip and configure settings accordingly.

FIG. 4 is a flowchart illustrating an example procedure for inspecting the endface of an optical-fiber connector, using the inspection microscope device 100 to detect the type of adapter tip 106 and configure settings accordingly.

In step 402, the user triggers the tip detection, e.g., by applying a long press on the trigger button 124 to initiate tip recognition. Of course, other means to trigger the tip detection may be devised.

In step 404, upon the tip detection trigger of step 402, the processing unit 114 activates the RFID controller 116 and instructions to the user may be displayed on the user interface.

In step 406, the RFID controller 116 powers the RFID antenna 118 so that it emits magnetic waves to energize any RFID tag 120 within accessible range.

Optionally, the user interface may display on screen the next steps to be followed by the user to complete the operation.

In step 408, the user taps on the inspection microscope device 100 or otherwise brings the adapter tip 106 close to the RFID antenna 118. For example, a position of the RFID antenna 118 may be marked by a special logo affixed on the inspection microscope device 100 to help the user to tap the adapter tip 106 close to the RFID antenna 118.

In step 410, the content of the RFID tag is read and the RFID controller 116 sends a notification to the processing unit 112.

In step 412, the processing unit 112 receives the information read from the RFID tag 120. Upon completion of the read process, the RFID antenna 118 is turned off.

In step 414, the processing unit 112 optionally selects the acquisition parameters of the next acquisition based on information read from the RFID tag 120. It may also select endface analysis parameters and/or the acceptance criteria based on information read from the RFID tag 120.

In step 416, useful information for the user is displayed in the user interface. For example, the tip identification name as read from the RFID tag 120 may be displayed on screen and/or the name of the connector type(s) corresponding to the adapter tip may be displayed and/or other useful information for the user.

For example, the tip identification displayed on screen may be declined as follows:

"U12MA: Universal 1.25 mm APC".

In some cases, one adapter tip 106 may support more than one connector type. In such cases, a list of the connector types that can be inspected using the detected adapter tip may be displayed.

Optionally, an image representing the supported connector(s) or the typical colors of the supported connectors (like aqua for multimode or green for singlemode APC) may be displayed as well.

It is noted that, the displayed information may further be used to assist a user who would need some help to determine which adapter tip 106 to use for a given task. For example, the displayed of the supported connectors may help the user determine if the adapter tip being tapped is that which he/she needs for the task. If it is not, the user may try different tips until the right one is found. For example, if the connector to be inspected is a single-mode APC connector, the user will need to find an adapter tip that supports such connector.

In step 418, the user connects the adapter tip 106 to the inspection microscope device 100 for optical-fiber connector inspection.

In step 420, upon the user applying a short press on the trigger button 124, an image capture of the connector endface is triggered. Optionally, image acquisition parameters (e.g. field of view) may be selected as a function of the information read on the RFID tag 120. For example, the field of view may be made wider if the adapter tip is for multi-fiber connectors and narrower if the adapter tip is for single-fiber connectors.

The processing unit 112 then receives the captured image and may analyze the image to produce an inspection result. The analysis may optionally be based on the determined connector endface acceptance criterion and/or on the determined endface analysis parameters.

In this embodiment, the RFID antenna 118 is powered only during the tip recognition procedure. The power for the RFID antenna 118 is quite substantial for a battery-powered product like the inspection microscope device 100 because the RFID tag 120 need to be wirelessly powered. This is why the procedure is made to be initiated only when triggered by the user. In other embodiments, e.g., where the inspection microscope device 100 is AC powered, the antenna may be continuously powered to allow the user to directly tap the tip at any time in order to initiate the detection procedure.

It will be understood that the use of a long press on the capture trigger button 124 to trigger the tip detection process is optional and can be replaced by other means. For example, the process may be initiated from a menu in the user interface. The menu may further allow the user to abort the recognition at any time.

If one or more features are not supported by the inspection microscope device 100 using the recognized tip, a message may be displayed, and the features be disabled. For example, a power detection feature may work only with some tips and not be supported for other tips, such as, e.g. legacy tips. Furthermore, legacy tips may not contain an RFID tag but still be supported by the inspection microscope device 100 for some connector inspection. In this case, the use of a legacy tip can be detected by detecting the absence of an RFID tag 124. Whenever a legacy tip is detected, the power detection feature may be deactivated and the user interface may request that the connector endface acceptance criteria be manually configured.

The RFID tags 124 may further help distinguish genuine tips from unauthorized low-cost copies.

Example of Inspection Microscope Device Architecture

Figure 5:
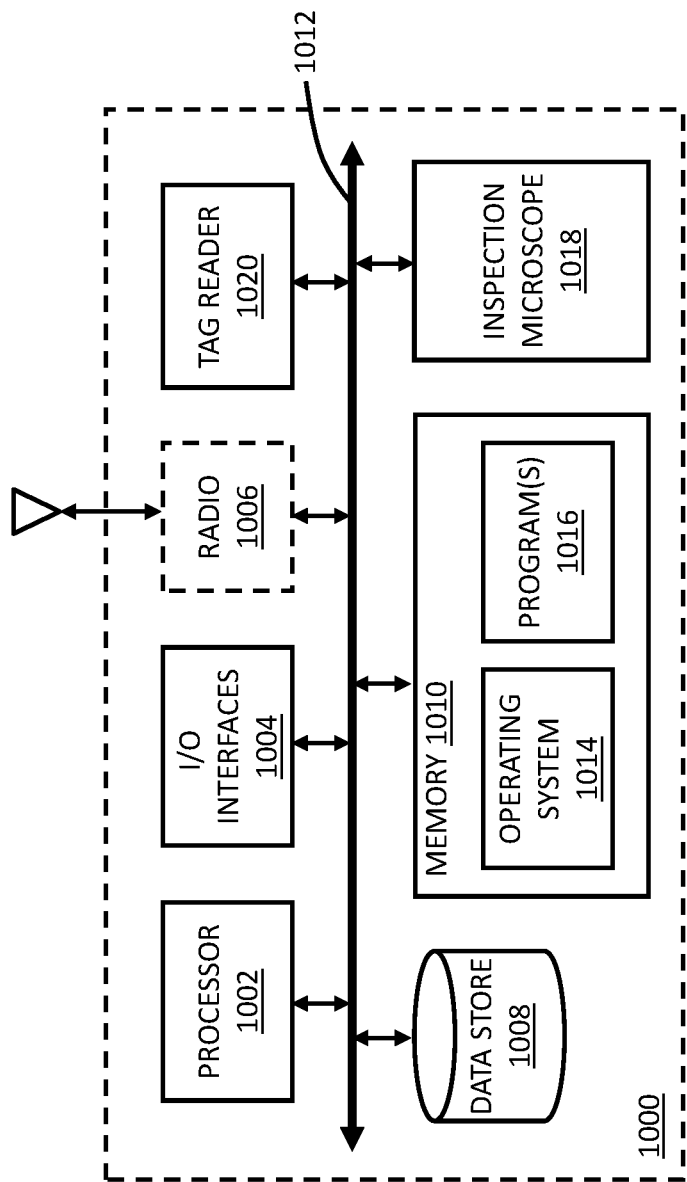
FIG. 5 is a block diagram illustrating an example architecture of an inspection microscope device of the system of FIG. 1.

FIG. 5 is a block diagram of an inspection microscope device 1000 which may embody the inspection microscope device 100 of FIG. 1 or FIG. 3. The inspection microscope device 1000 may comprise a digital device that, in terms of hardware architecture, generally includes a processor 1002, input/output (I/O) interfaces 1004, an optional radio 1006, a data store 1008, a memory 1010, as well as an optical test device including an inspection microscope 1018. The inspection microscope device 1000 may further comprise a tag reader 1020 as described herein. It should be appreciated by those of ordinary skill in the art that FIG. 5 depicts the inspection microscope device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the inspection microscope device 1000 is in operation, the processor 1002 is configured to execute software stored within the memory 1010, to communicate data to and from the memory 1010, and to generally control operations of the inspection microscope device 1000 and tag reader 1020 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the inspection microscope device 1000 and/or output at least one of the values derived by the inspection microscope analyzing software.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as inspection microscope images. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 5, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the inspection microscope device 1000. For example, example programs 1016 may include a web browser to connect with a server for transferring inspection result data files, a dedicated inspection microscope application configured to control inspection microscope measurements by the inspection microscope 1018, set image acquisition parameters, analyze connector endface images obtained by the inspection microscope 1018 and display a GUI related to the inspection microscope device 1000.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the inspection microscope device 1000 via the radio 1006. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

It should be noted that the inspection microscope device shown in FIG. 5 is meant as an illustrative example only. Numerous types of computer systems are available and can be used to implement the inspection microscope device.

Example of Inspection Microscope Architecture

Figure 6:
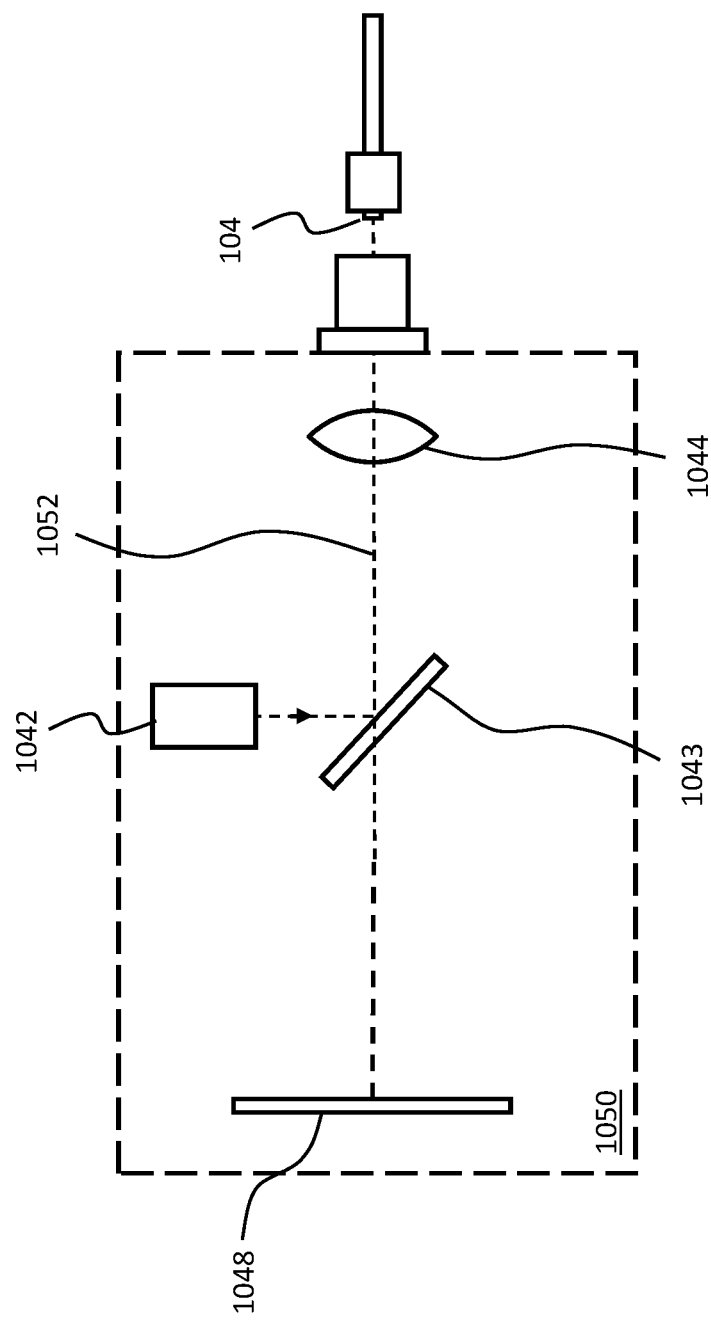
FIG. 6 is a block diagram illustrating an example architecture of an inspection microscope of the inspection microscope system of FIG. 5.

FIG. 6 is a block diagram an embodiment of an inspection microscope 1050 which may embody the inspection microscope 1018 of the inspection microscope device 1000 of FIG. 5. It should be appreciated by those of ordinary skill in the art that FIG. 6 depicts the inspection microscope 1050 in a simplified manner, and a practical embodiment may include additional optical and electronic components that are not described in detail herein.

As will be understood by one skilled in the art, the inspection microscope 1050 incorporates an imaging assembly comprising an illumination source 1042 for illuminating the connector endface 104 to be inspected, an illumination beam splitter 1043 to direct illumination light toward the connector endface 104, an image detector 1048, and imaging optics, including an objective lens 1044 (and optionally other lenses, mirrors and/or other optical components defining objective optics), for imaging the illuminated connector endface 104, on an image plane coinciding with the image detector 1048. The object plane as defined herein is determined by the objective lens 1044 and coincides with the plane where the connector endface 104 to be inspected (i.e. the object) should be positioned (within the focusing range of the imaging assembly 1040) to be suitably imaged on the image detector 1048. The optical path between the object plane and the image plane defines an imaging path 1052 of the inspection microscope, along which propagates the inspection light beam resulting from a reflection of illumination light on the connector endface 104, for optical magnification of the object (i.e. the connector endface 104) positioned on the object plane.

Typically, a wavelength of the illumination beam is relatively short in order to enhance the imaging resolution (since the diffraction limit is proportional to the wavelength) while keeping a wavelength that can be measured using commercially available image sensors which are both cost- and size-accessible, such as a complementary metal-oxide-semiconductor (CMOS) sensor or a charge-coupled device (CCD), for instance. For example, the illumination source 1042 can be embodied in a light-emitting diode (LED) emitting in the blue region (about 470 nm) or the violet region (about 405 nm). Indeed, such a blue or violet light allows for an acceptable imaging resolution while being easily measured using conventional CMOS sensors or CCDs. Of course, other illumination sources and/or any other suitable spectral region within the visible spectrum, the near ultraviolet spectrum or the near infrared spectrum can be found suitable depending on the available components.

The embodiments described above are intended to be exemplary only. The scope of the invention is therefore intended to be limited solely by the appended claims.

The invention claimed is:

1. An optical-fiber connector endface inspection microscope system for inspecting an endface of an optical-fiber connector, the optical-fiber connector endface inspection microscope system comprising:
an optical-fiber connector endface inspection microscope comprising an image detector for capturing at least one image of the endface to be inspected;
a housing structure enclosing the optical-fiber connector endface inspection microscope and releasably connectable to an adapter tip configured to interface with the optical-fiber connector to inspect the endface thereof, the adapter tip being of one type among a plurality of adapter tip types adapted to inspect respective types of optical-fiber connectors;
a tip detection system adapted to recognize said one type of the adapter tip among the plurality of adapter tip types;
a processing unit configured for:
determining at least one connector endface acceptance criterion among a set of connector endface acceptance criteria, at least partly based upon a fiber type corresponding to the recognized type of adapter tip; and
analyzing the at least one image to produce an inspection result for the endface based on the determined connector endface acceptance criterion.

2. The optical-fiber connector endface inspection microscope system as claimed in claim 1, wherein the processing unit is further configured for determining image acquisition parameters at least partly based upon the recognized type of adapter tip; and for configuring the optical-fiber connector endface inspection microscope based on the determined image acquisition parameters.

3. The optical-fiber connector endface inspection microscope system as claimed in claim 1, wherein the tip detection system comprises a RFID reader and a RFID antenna and wherein the adapter tip comprises a RFID tag; from a reading of the RFID tag by the RFID reader, the tip detection system recognizing at least one of: the type of adapter tip and the type of fiber type associated with the adapter tip.

4. The optical-fiber connector endface inspection microscope system as claimed in claim 3, the adapter tip is to be recognized by bringing it close to the RFID antenna before being connected to the housing structure.

5. The optical-fiber connector endface inspection microscope system as claimed in claim 3, wherein the tip detection system is enclosed in the housing structure.

6. The optical-fiber connector endface inspection microscope system as claimed in claim 3, wherein the tip detection system is enclosed in a mobile device physically separate from the housing structure.

7. The optical-fiber connector endface inspection microscope system as claimed in claim 1, wherein upon recognition of the type of the adapter tip, a limited number of choices of connector endface acceptance criterion are determined and wherein the connector endface acceptance criterion is determined among the limited number of choices based on a user input.

8. The optical-fiber connector endface inspection microscope system as claimed in claim 1, wherein the tip detection system is configured to recognize the adapter tip upon connection to the housing structure.

9. The optical-fiber connector endface inspection microscope system as claimed in claim 1, wherein the tip detection system receives a picture of the adapter tip and analyzes the picture to recognize the type of adapter tip.

10. The optical-fiber connector endface inspection microscope system as claimed in claim 1, wherein the processing unit is further configured for displaying on a display screen, a visual indicator corresponding to the at least one connector type that can be inspected using the recognized adapter tip.

11. An optical-fiber connector endface inspection microscope system for inspecting an endface of an optical-fiber connector, the optical-fiber connector endface inspection microscope system comprising:
an optical-fiber connector endface inspection microscope comprising an image detector for capturing at least one image of the endface to be inspected;
a housing structure enclosing the optical-fiber connector endface inspection microscope and releasably connectable to an adapter tip configured to interface with the optical-fiber connector to inspect the endface thereof, the adapter tip being of one type among a plurality of adapter tip types adapted to inspect respective types of optical-fiber connectors;
a tag reader adapted to read information contained in a tag associated with the adapter tip;
a processing unit configured for:
analyzing the at least one image to produce an inspection result for the endface, at least partly based upon the information read from the tag.

12. The optical-fiber connector endface inspection microscope system as claimed in claim 11, wherein the processing unit is configured for: determining at least one connector endface acceptance criterion among a set of connector endface acceptance criteria, at least partly based upon the information read from the tag; and analyzing the at least one image to produce an inspection result for the endface based on the determined connector endface acceptance criterion.

13. The optical-fiber connector endface inspection microscope system as claimed in claim 11, wherein the processing unit is configured for: selecting image acquisition parameters at least partly based upon the information read from the tag and to be used in capturing at least one image of the endface to be inspected.

14. The optical-fiber connector endface inspection microscope system as claimed in claim 11, wherein the processing unit is configured for: selecting endface analysis parameters at least partly based upon the information read from the tag and to be used in analyzing the at least one image to produce an inspection result for the endface.

15. The optical-fiber connector endface inspection microscope system as claimed in claim 11, wherein the tag reader comprises a RFID reader and a RFID antenna in the housing structure and wherein the adapter tip comprises a RFID tag.

16. The optical-fiber connector endface inspection microscope system as claimed in claim 15, the adapter tip is to be recognized by bringing it close to the RFID antenna before being connected to the housing structure.

17. The optical-fiber connector endface inspection microscope system as claimed in claim 15, wherein the tag reader is enclosed in the housing structure.

18. The optical-fiber connector endface inspection microscope system as claimed in claim 15, wherein the tag reader is enclosed in a mobile device physically separate from the housing structure.

19. The optical-fiber connector endface inspection microscope system as claimed in claim 12, wherein upon reading information contained in a tag, a limited number of choices of connector endface acceptance criterion are determined and wherein the connector endface acceptance criterion is determined among the limited number of choices based on a user input.

20. The optical-fiber connector endface inspection microscope system as claimed in claim 11, wherein the tag reader is configured to read information upon connection to the housing structure.

21. The optical-fiber connector endface inspection microscope system as claimed in claim 11, wherein the processing unit is further configured for displaying on a display screen, a visual indicator corresponding to the at least one connector type that can be inspected using the adapter tip.

22. A method for inspecting the endface of an optical-fiber connector using optical-fiber connector endface inspection microscope device releasably connectable to an adapter tip configured to interface with the optical-fiber connector to inspect the endface thereof, the adapter tip being of one type among a plurality of adapter tip types adapted to inspect respective types of optical-fiber connectors, the method comprising:
  using a tip detection system, recognizing said one type of the adapter tip among the plurality of adapter tip types;
  using an optical-fiber connector endface inspection microscope, capturing at least one image of the endface to be inspected;
  determining at least one connector endface acceptance criterion among a set of connector endface acceptance criteria, at least partly based upon a fiber type corresponding to the recognized type of adapter tip; and
  analyzing the at least one image to produce an inspection result for the endface based on the determined connector endface acceptance criterion.

\* \* \* \* \*